United States Patent
Kim et al.

(10) Patent No.: US 7,511,115 B2
(45) Date of Patent: Mar. 31, 2009

(54) METHOD OF PREPARING BIODEGRADABLE POLYESTER POLYMER MATERIAL IN THE FORM OF FILAMENT AND SHEET USING COMPRESSED GAS

(75) Inventors: Soo Hyun Kim, Seoul (KR); Sang Heon Kim, Seoul (KR); Cheol Soo Yoon, Yongin-si (KR); Se Yoon Kim, Seoul (KR); Hang Soo Lee, Incheon (KR)

(73) Assignee: Korea Institute of Science & Technology, Seoul (KR)

( * ) Notice: Subject to any disclaimer, the term of this patent is extended or adjusted under 35 U.S.C. 154(b) by 94 days.

(21) Appl. No.: 11/705,907

(22) Filed: Feb. 13, 2007

(65) Prior Publication Data

US 2007/0299236 A1 Dec. 27, 2007

(51) Int. Cl.
*C08G 63/00* (2006.01)
*C08G 63/02* (2006.01)

(52) U.S. Cl. .............. 528/271; 264/210.3; 264/210.5; 264/210.7; 417/53; 428/328; 525/178; 528/272

(58) Field of Classification Search .......... 428/328; 528/271, 272; 264/210.3, 210.5, 210.7; 417/53; 525/178
See application file for complete search history.

(56) References Cited

U.S. PATENT DOCUMENTS

| | | | |
|---|---|---|---|
| 3,081,519 A | 3/1963 | Blades et al. | |
| 3,169,899 A | 2/1965 | Steuber et al. | |
| 3,227,794 A | 1/1966 | Anderson et al. | |
| 3,860,369 A | 1/1975 | Brethauer et al. | |
| 2004/0038022 A1 * | 2/2004 | Maugans et al. | 428/328 |

FOREIGN PATENT DOCUMENTS

| WO | WO 97/12086 | 4/1997 |
|---|---|---|
| WO | WO 98/07906 | 2/1998 |
| WO | WO 98/07908 | 2/1998 |
| WO | WO 98/39509 | 9/1998 |
| WO | WO 98/44176 | 10/1998 |
| WO | WO 01/23125 | 4/2001 |

OTHER PUBLICATIONS

D. Hile, et al. *Macromol. Rapid Commun.* 20, 511-514 (1999) "Ring-opening precipitation polymerization of poly(D,L-lactide-co-glycolide) in supercritical carbon dioxide".
D. Hile, et al. *Journal of Polymer Science: Part A: Polymer Chemistry*, vol. 39, 562-570 (2001) "Emulsion Copolymerization of D,L-Lactide and Glycolide in Supercritical Carbon Dioxide".

* cited by examiner

Primary Examiner—Terressa M Boykin
(74) Attorney, Agent, or Firm—Jones Day

(57) ABSTRACT

Embodiments of the present invention may provide a method of preparing biodegradable polyester polymer materials both in a filament type and a sheet type using a compressed gas. The method of the present invention comprises the following steps: 1) preparing biodegradable polyester polymers through a solution-state polymerization process of a cyclic monomer using a compressed gas as a reaction solvent in the presence of a catalyst; 2) performing a flash-spinning process of the biodegradable polyester polymers prepared above to form a polymer material in a filament type; and 3) performing a calendering process of the polymer material in a filament type prepared above to form a polymer material in a point-bonded sheet type. Since the method according to the embodiments of the present invention has several advantages in that it employs compressed gas as a reaction solvent, which does not require the addition of a stabilizer and the solution-state polymerization, flash-spinning and callendering processes are conducted in a single consecutive process. This can be effectively used in the manufacture of biodegradable polyester polymer materials, which can be used as a biodegradable and biocompatible material useful in the fields of medicine, chemistry, agriculture, environment and the like.

17 Claims, 2 Drawing Sheets

METHOD OF PREPARING BIODEGRADABLE POLYESTER POLYMER MATERIAL IN THE FORM OF FILAMENT AND SHEET USING COMPRESSED GAS

The present application claims priority from Korean Patent Application No. 10-2006-56831 filed Jun. 23, 2006, the entire subject matter of which is incorporated herein by reference.

BACKGROUND

1. Field

Embodiments of the present invention may relate to a method of preparing biodegradable polyester polymer materials both in a filament type and a sheet type using a compressed gas. Embodiments of the present invention may relate to a method of preparing biodegradable polyester polymer materials both in a filament type and a sheet type, which comprises the following steps: 1) preparing biodegradable polyester polymers through a solution-state polymerization process of a cyclic monomer using a compressed gas as a reaction solvent in the presence of a catalyst; 2) performing a flash-spinning process of the biodegradable polyester polymers prepared above in order to form a polymer material in a filament type; and 3) performing a calendering process of the polymer material in a filament type prepared above in order to form a polymer material in a point-bonded sheet type.

2. Background

The basic flash-spinning process of making flash-spun nonwoven products, specifically Tyvek® spunbonded olefin, was first developed more than twenty-five years ago and put into commercial use by DuPont (E.I. du Pont de Nemours). During that time, DuPont developed two basic forms of a surface-bonded material and a point-bonded material for flash-spun nonwoven products. The surface-bonded material is prepared by thermally bonding flash-spun nonwoven products with traversing the surface of a sheet. Further, the point- or pattern-bonded material is prepared by thermally bonding flash-spun nonwoven products to a point or pattern forming the part of a sheet showing a much more or weaker binding affinity. While the surface-bonded material is typically stiffer than the point-bonded material and has a paper-like hard structure, the point-bonded material is more flexible and has a fabric-like soft structure.

The general flash-spinning apparatus is disclosed in U.S. Pat. No. 3,860,369 issued to Brethauer et al. Further, the process of forming plexifilamentary film-fibril strands and forming the same into a nonwoven sheet material has been disclosed and extensively discussed in U.S. Pat. No. 3,081,519 issued to Blades et al., U.S. Pat. No. 3,227,794 issued to Anderson et al. and U.S. Pat. No. 3,169,899 issued to Steuber (all of which are assigned to DuPont). This process and various improvements thereof have been practiced by DuPont for a number of years in manufacturing its Tyvek® spunbonded olefin.

A degradable polymer material has been in the spotlight in various fields of medicine, agriculture, environment and the like due to its specific degradable characteristics. The biodegradable polymer is roughly divided into a natural biodegradable polymer and a synthetic biodegradable polymer. Among them, the natural biodegradable polymer, which is made of natural materials, has several advantages such as high affinity to the environment, high physical properties, adaptability to a living body and the like. However, the natural biodegradable polymer suffers from disadvantages since it is expensive and cannot be arbitrarily controlled due to its natural characteristics. Meanwhile, the commercial value of synthetic biodegradable polymer has been constantly growing since its characteristics can be artificially regulated to make up for the weak points. This is clearly different from the natural biodegradable polymer.

Among the synthetic biodegradable polymer materials, polylactide (cPLA) exhibits good physical properties as well as high compatibility and innoxiousness to the environment. Thus, it has received a considerable attention in the environmental and medical fields. Especially, the synthetic biodegradable polymer material has been efficiently used in the environmental field such as a disposable wrap film, an agricultural and industrial film and a food packaging container, as well as in the medical field such as a drug delivery system (DDS), a pin, a screw and a suture for fixing the bone and tissue, etc.

The synthetic biodegradable polymer with high molecular weight is generally prepared by a solid-state polymerization process using only a monomer and a catalyst in the absence of a solvent, wherein the monomer is polymerized at a temperature below the melting temperature of the polymer. However, the solid-state polymerization process has several problems such as non-uniformity of physical properties, adulteration of low molecular weight materials and workability deterioration. In particular, in order to apply a polymer prepared in the large-scaled solid-state to a molding fabrication process, the polymer should be crushed into a small size. This makes the preparation process complicated during the mass-production of a commercial scale and increases the production costs.

In order to overcome these problems, there have been reported several methods of preparing a polylactide copolymer, which is useful as a biodegradable and biocompatible material by a ring opening polymerization method using alkyl lactate monomer, a stabilizer, a metal compound catalyst and supercritical carbon dioxide as a dispersion medium (Hile, D. D. and Pishko, M. V., *Macromol. Rapid Commun.* 20: 511-514, 1999; Hile, D. D. and Pishko, M. V., *J. Polym. Sci. Part A: Polym. Chem.* 39: 562-570, 2001). Since the polylactide copolymer prepared according to the above method is insoluble to supercritical carbon dioxide, a fluoropolymer must be inevitably used as a stabilizer. However, although the polymerization is conducted for 48 to 72 hours, since the molecular weight of the polymer prepared by said method is at most in the range of 28,000 to 30,000 g/mol, there is a problem in that the molecular weight of the polymer is extremely low for the long reaction time. Further, it is cumbersome since the additional process of removing the stabilizer must be carried out after the reaction is completed.

Also, carbon dioxide as the supercritical fluid is frequently used due to its low critical temperature and critical pressure, low costs, incombustibility and innoxiousness. However, the supercritical carbon dioxide cannot dissolve polymers, except for fluoride-containing polymers and silicon-containing polymers (e.g., siloxane). Hydrocarbons and hydrochlorofluorocarbons (HCFCs) are known to optimally dissolve various polymers with high molecular weight when being used as a solvent.

In order to resolve the aforementioned problems of the conventional methods for preparing a biodegradable polyester in the solid-state process or using the supercritical carbon dioxide, the present invention has developed a method of preparing biodegradable polyester polymers both in a filament type and a sheet type. This is achieved by: preparing polymers with high molecular weight in the particle form within a short reaction time using a compressed gas such as hydrofluorocarbons (HFCs), HCFCs, dimethylethers and the like, which are in a supercritical state and can be used as a reaction solvent for a solution-state polymerization process; and performing flash-spinning and callendering processes of the polymers prepared above in a reactor as a single consecutive process to form polymer materials both in a filament type and a sheet type.

BRIEF DESCRIPTION OF THE DRAWINGS

Arrangements and embodiments may be described in detail with reference to the following drawings in which like reference numerals refer to like elements and wherein:

FIGS. 2 and 3 illustrate biodegradable polyester polymer materials manufactured by the method in accordance with embodiments of the present invention, wherein FIG. 3 shows a magnification image of FIG. 2.

DETAILED DESCRIPTION

Figure 1:
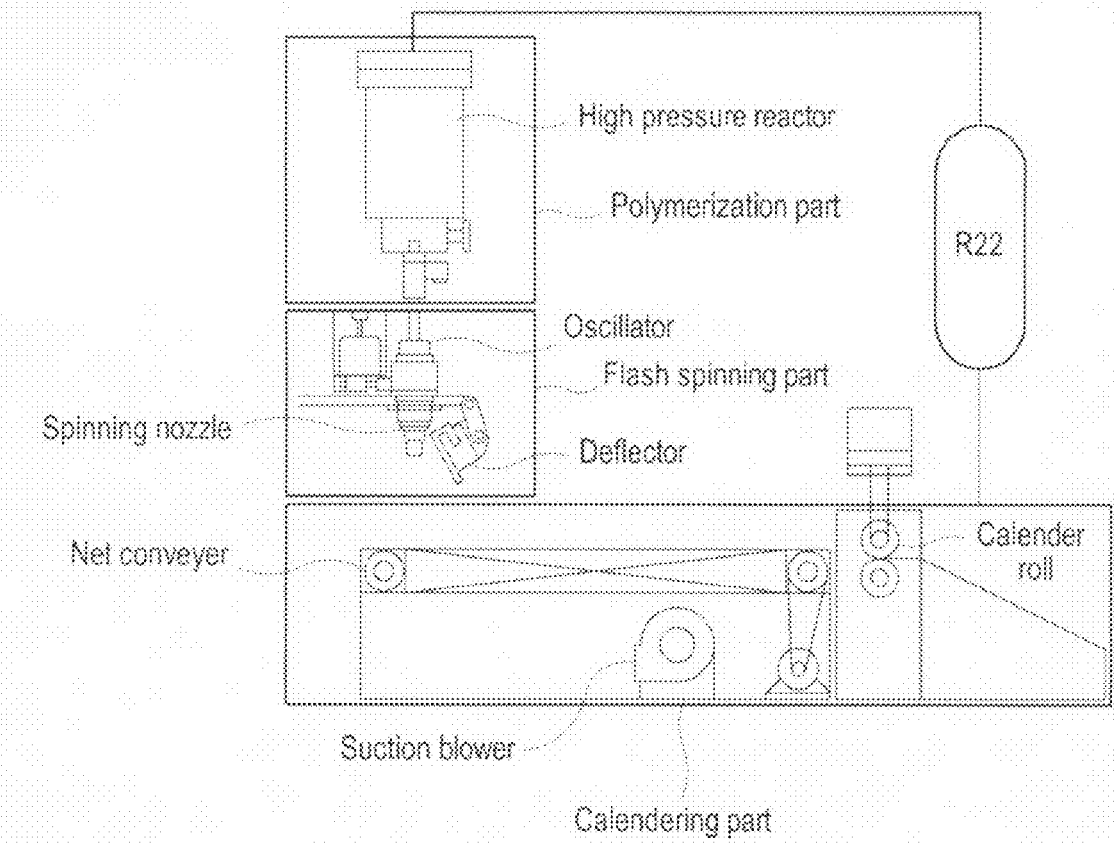
FIG. 1 is a diagram schematically illustrating a method of preparing a biodegradable polyester polymer material in the form of a filament and a sheet using compressed gas in accordance with embodiments of the present invention.
Figure 2:
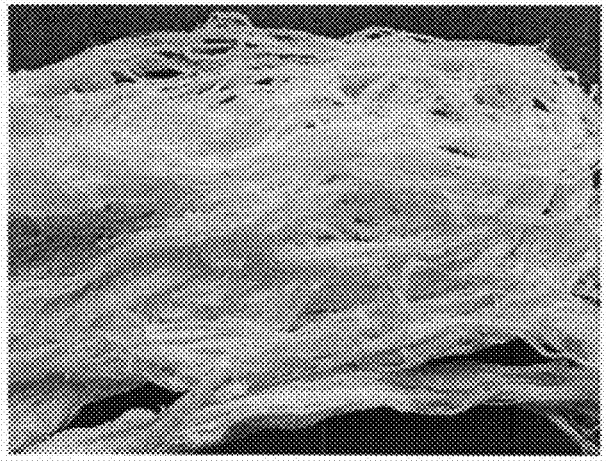
Figure 3:

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Therefore, the embodiments of the present invention have been made in view of the above problems of the prior art. It is one object of the embodiments of the present invention to provide a method of preparing biodegradable polyester polymer materials both in a filament type and a sheet type within a short time through a simple process without using any stabilizer.

In accordance with one aspect of the embodiments of the present invention for achieving the above object, there is provided a method of preparing biodegradable polyester polymer materials both in a filament type and a sheet type by using a compressed gas, which comprises the steps of:

1) preparing biodegradable polyester polymers through a solution-state polymerization process of a cyclic monomer using a compressed gas as a reaction solvent in the presence of a catalyst;

2) performing a flash-spinning process of the biodegradable polyester polymers prepared above in order to form a polymer material in a filament type; and 3) performing a calendering process of the polymer material in a filament type prepared above in order to form a polymer material in a point-bonded sheet type.

Hereinafter, the method according to the embodiments of the present invention will be explained in more detail.

The method according to the embodiments of the present invention is characterized by the following: the solution-state polymerization process of a cyclic monomer using a compressed gas as a reaction solvent in the presence of a catalyst to prepare a biodegradable polyester homopolymer or copolymer having a high molecular weight; the flash-spinning process of the polymerized biodegradable polyester polymer under the same temperature and pressure as employed in the solution-state polymerization process to prepare a polymer material in a filament type; and the callendering process of the polymer material in a filament type to prepare a polymer material in a point-bonded sheet type.

In step 1), the biodegradable polyester polymers of a cyclic monomer are prepared by a solution-state polymerization process using a compressed gas as a reaction solvent in the presence of a catalyst. The solution-state polymerization of a cyclic monomer may be carried out at a temperature of 100° C. to 200° C. and under pressure of 40 to 700 bar.

The compressed gas used as a reaction solvent in step 1) is in a supercritical fluid state and can be used for the solution-state polymerization process. The preferred examples of the compressed gas may include HFC (hydrofluorocarbons), HCFC (hydrochlorofluorocarbons), dimethylether and a mixture thereof.

A supercritical fluid is a material, which can be either liquid or gas, used in a state above the critical temperature ($T_c$) and critical pressure ($P_c$) where gases and liquids can coexist. Every pure gas has the critical temperature ($T_c$) above which gas cannot be liquefied regardless of the pressure applied and the critical pressure ($P_c$), which is the pressure required to liquefy the gas at its critical temperature. Since the supercritical fluid existing at a temperature and pressure above the critical points exhibit gas-like viscosity while maintaining liquid-like solubility, it has been suggested as a promising substitute for replacing a non-compressible organic solvent.

Since carbon dioxide as a supercritical fluid can dissolve a fluoride- or a silicon-containing polymer, it has been used in the homogeneous solution-state polymerization of a homopolymer or a copolymer of said polymers. However, in the polymerization of other polymers except the above described polymers, since most of the polymers are insoluble to supercritical carbon dioxide, it is necessary to use a stabilizer. This leads to numerous problems in that heterogeneous polymerization occurs and the stabilizer has to be removed after the polymerization is completed.

In order to overcome these problems, the present inventors have developed a solution-state polymerization system using a compressed gas such as HFC, HCFC, dimethylether or a mixture thereof as a reaction solvent instead of a supercritical carbon dioxide, which can solubilize only a restricted range of polymers and requires the use of a stabilizer. Preferred examples of the compressed gas may include HFC-23, HFC-32, HFC-152a, HFC-143a, HFC-134a, HFC-125, HFC-227ea, HFC-236fa, HFC-245fa, HFC-254cb, SF6, HFC-4-10-mee, C-318 (perfluoro cyclobutane), HCFC-22, HCFC-1416, HCFC-1426, HCFC-225ca/cb, dimethylether, nitrous oxide, propane, butane, a mixture thereof and a carbon dioxide mixture thereof. In case of mixing the compressed gas with carbon dioxide, it is preferable that the weight ratio of carbon dioxide to the total amount of the mixture does not exceed 20%. This is because if the weight ratio of carbon dioxide exceeds 20%, then the polymer with a high molecular weight would not be dissolved in the reaction solvent. Thus, precipitation polymerization occurs in a reactor.

The most preferred compressed gas used in the solution-state polymerization according to the embodiments of the present invention is HCFC-22. HCFC-22 is a supercritical fluid, which exhibits superior solubility to high molecular weight polyester due to a particular interaction between its hydrogen atom and an ester group of the polymer. Further, it has relatively mild critical points as being 96° C. of Tc and 50 bar of Pc. Particularly, HCFC-22 has the following advantages: 1) it is capable of solubilizing a monomer, an initiator and a catalyst under the reaction temperature and pressure; 2) it is chemically inert to a monomer; and 3) it is inexpensive, noninflammable, nontoxic and recyclable.

For the solution-state polymerization using the compressed gas such as HCFC-22 as a reaction solvent, the method according to the embodiments of the present invention has been designed to completely liquefy the compressed gas injected into a container by passing through a condenser at first, wherein the liquefied compressed gas is then introduced into a high pressure reactor while being pressurized by a high pressure liquid pump. At this time, the high pressure reactor is sealed to make a pressure therein up to 350 bar. It is equipped with a proportional-integral-differential temperature controller, a thermometer, a heater, a pressure gauge, a safety valve, a stirrer capable of mixing a reaction mixture, a speed controller and a tachometer for measuring speed.

The cyclic monomer used in step 1) may be exemplified by one or more monomers selected from the group consisting of lactides, lactones, cyclic carbonates, cyclic anhydrides and thiolactones. Preferably, the cyclic monomer is a compound represented by the following Formula 1 and/or a compound represented by the following Formula 2:

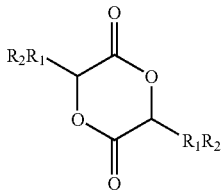

<Formula 1> wherein $R_1$ and $R_2$ are independently hydrogen or $C_1$-$C_4$ alkyl.

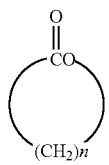

<Formula 2> wherein n is an integer in the range of 2 to 5.

More preferably, the compound of Formula 1 may be lactides including L-lactide, D-lactide and D,L-lactide or glycolides, whereas the compound of Formula 2 may be caprolactone with n=5, in particular ε-caprolactone.

The ratio of the cyclic monomer to the compressed gas used as a reaction solvent is preferably in the range of 1 weight % to 50 weight %, more preferably 5 weight % to 40 weight %. If the ratio of the cyclic monomer to the reaction solvent is lower than 1 weight %, then the polymers having a relatively low molecular weight would be polymerized. If the ratio thereof is greater than 50 weight %, then the entire amount of the polymer does not dissolve in the compressed gas. This causes solid-state polymerization to occur instead of supercritical polymerization, thereby polymerizing the heterogeneous polymers.

The catalyst employable in the solution-state polymerization process of step 1) may be exemplified by zinc-, tin- or aluminum-based organometal catalysts or acid catalysts such as zinc bis(2,2-dimethyl-3,5-heptanedionato-O,O'). Representative examples of the organometal catalyst may include tin-based catalysts such as stannous octoate, stannous chloride, stannous oxide, stannous octylester, stannous chloride dehydrate, tetraphenyl tin and the like. Further, the representative examples of the zinc-based catalysts may include diethyl zinc, zinc octoate, zinc chloride, zinc oxide and the like. Also, the representative examples of the aluminum-based catalysts may include aluminum chloride, aluminum ethoxide and the like. Among them, stannous octoate and aluminum chloride may be more preferably employed.

The mole concentration of the catalyst in step 1) is preferably in the range of $1.0 \times 10^{-4}$ mol/l to $5.0 \times 10^{-1}$ mol/l. When the mole concentration of the catalyst is greater than $5.0 \times 10^{-1}$ mol/l, the amount of the initiator acting as a molecular weight regulator becomes excessive. This results in lowering the molecular weight of the synthesized biodegradable polyester polymer to 30,000 g/mol or below. Meanwhile, the mole concentration of the catalyst, which is lower than $10 \times 10^{-4}$ mol/l, cannot shorten the reaction time for polymerization. Thus, 48 hours or more need to be incurred to obtain a polymer with the desired molecular weight and the operation costs of the reactor would be increased.

A typical initiator may be added to the solution-state polymerization process of step 1). Representative examples of the initiator may include a divalent alcohol such as 1,6-hexanediol, 1-dodecanol and the like. At this time, the mole concentration of the initiator added is preferably in the range of $1.0 \times 10^{-5}$ mol/l to $1.0 \times 10^{-3}$ mol/l. If the mole concentration of the initiator exceeds $1.0 \times 10^{-3}$ mol/l, this is undesirable since the reaction speed is faster than the range which can be controlled. Also, if the mole concentration thereof is lower than $1.0 \times 10^{-5}$ mol/l, then the polymerization cannot be optimally performed due to lack of radicals capable of participating in the reaction. Although the reaction is performed, there is a problem of extremely slow growth rate.

The molecular weight of the biodegradable polyester polymer prepared in step 1) may be varied by regulating the type and concentration of the compressed gas used as a reaction solvent, the type and amount of the catalyst added, the polymerization conditions such as reaction temperature, pressure and time, etc. It is preferable to conduct the solution-state polymerization for 0.2 to 50 hours so that a conversion rate reaches 70% or more.

When the compressed gas is used as a reaction solvent in the solution-state polymerization process as described above, it is possible to polymerize biodegradable polyester polymers having a high molecular weight within a short time. Since there is no need to add any stabilizer different from the prior art polymerization methods, which employ supercritical carbon dioxide as a dispersion media, the method according to the embodiments of the present invention does not require an additional step of removing the stabilizer, thereby simplifying the entire process.

In step 2), a polymer material in a filament type (hereinafter referred to as "filament material") is prepared by performing a flash-spinning process of the biodegradable polyester polymer prepared in step 1). The flash-spinning process is carried out under the same temperature and pressure conditions as employed in the solution-state polymerization process.

Referring to FIG. 1, the flash-spinning process of step 2) is explained in more detail as follows. First, the biodegradable polyester polymer solution prepared in a single-phase in step 1) is subjected to flash-spinning through a spinning nozzle 2 from a reactor 1. At this time, the flash-spun solution is in the form of a two-phase liquid-liquid dispersion, wherein one phase of the dispersion is a spin agent-rich phase containing most of the spin agents, which make the flash spinning possible by pushing the polymer out of the reactor while being pressurized. The other phase is a polymer-rich phase containing most of the biodegradable polyester polymers. This two-phase liquid-liquid dispersion is conveyed to a region to which significantly low pressure (preferably, atmospheric pressure) is applied, where the spin agent is rapidly evaporated (fished) through the spinning nozzle 2. The biodegradable polyester polymer prepared in step 1) is extruded from the spinning nozzle 2 as the filament material.

The extruded filament material of the biodegradable polyester polymer is prepared into a point-bonded sheet type of polymer material (hereinafter referred to as "point-bonded sheet material") through a calendering process in step 3). As illustrated in FIG. 1, when the filament material is extruded from the spinning nozzle 2 in step 2), it is transformed into the form of a flat web having about 5 to 20 cm in width due to the vibrations of an oscillator 3. The web falls down to a deflector 4 on a net conveyer 5, which is located at about 50 cm downward from the spinning nozzle 2, and is collected therein. At this time, in order to absorb the sudden shocks applied to the web pouring down to the deflector 4 at high speeds, a suction blower 6 is employed. The collected webs on the net conveyer 5 are transported on a conveyer belt and subjected to calendering through a calender roll 7, thereby preparing a point-bonded sheet material. The prepared point-bonded sheet material is not stiffer than a surface-bonded sheet material and thus exhibits a fabric-like soft texture.

The surface area of the filament material prepared by flash-spinning of the biodegradable polyester polymer, which is prepared according to the embodiments of the present invention, is measured in accordance with a BET nitrogen absorption method (S. Braunauner, P. H. Emmett and E. Teller, *J. Am. Chem. Soc.* 60: 309-319, 1938). As a result, it has been confirmed that the filament material has the surface area in the range of 10 to 50 $m^2/gm$. Said surface area is significantly larger than those of filament materials prepared by other fiber spinning techniques. This demonstrates that the method according to the embodiments of the present invention can provide high untransparency, which is typically required in unwoven sheet products.

Accordingly, as mentioned above, the method according to the embodiments of the present invention can prepare a biodegradable polyester polymer within a short time through a solution-state polymerization process using compressed gas as a reaction solvent. It can then prepare polymer materials both in a filament type and a sheet type through flash-spinning and callendering processes, wherein the entire process of the method is conducted in a single consecutive process. Thus, it can be effectively used in the manufacture of a biodegradable polyester polymer, which has high commercial utility value in various fields of medicine, chemistry, agriculture, environment and the like.

The embodiments of the present invention will now be described in more detail with reference to the following examples. However, the examples are given for the purpose of illustration and are not to be construed as limiting the scope of the invention.

EXAMPLE 1

900 g of L-lactide monomer was put into a 3 l high pressure reactor and 8.39 g of stannous octoate was added thereto as a catalyst. 2,674 g of HCFC-22 was injected into the high pressure reactor while being pressurized by a high pressure liquid pump. The inner temperature and inner pressure of the reactor were set up to 130° C. and 240 bar, respectively. When the temperature and pressure were constant, solution-state polymerization was conducted for 5 hours. The weight average molecular weight (Mw) of the polymerized polylactide measured by a Ubbelohde viscosity method (Kim, S. H. et al, *Macromol. Chem.* 193: 1623, 1992) was in the range of 100,000 to 160,000 g/mol. Its production yield determined by a MeOH precipitation method was in the range of 90 to 98%.

EXAMPLE 2

The solution-state polymerization was carried out according to the same method as described in Example 1, except that 1,090 g of L-lactide, 10.17 g of stannous octoate and 2,590 g of HCFC-22 were employed. Further, the inner pressure of the reactor was settled to 320 bar. The prepared polylactide exhibited similar properties to those of Example 1.

EXAMPLE 3

The solution-state polymerization was carried out according to the same method as described in Example 1, except that 1,242 g of L-lactide, 11.59 g of stannous octoate and 2,460 g of HCFC-22 were employed. Further, the inner pressure of the reactor was settled to 340 bar. The prepared polylactide exhibited similar properties to those of Example 1.

EXAMPLES 4 TO 6

Each polylactide prepared in Examples 1 to 3 was subjected to flash-spinning through a spinning nozzle to thereby prepare a filament type of a polymer material. At this time, HCFC-22 as a reaction solvent was injected into the reactor by means of a high pressure pump, thereby maintaining the inner temperature of the reactor at 130° C. and inner pressure thereof to the same pressure as employed in the solution-state polymerization during the flash spinning process. Further, the nozzle temperature was maintained at a temperature in the range of 180 to 200° C. Surface areas and mechanical properties of the filament materials prepared by flash-spinning under different conditions were measured, wherein the results are shown in Table 1.

TABLE 1

|  | Example | | |
| --- | --- | --- | --- |
|  | 1 | 2 | 3 |
| L-lactide (g) | 900 | 1,090 | 1,242 |
| HCFC-22 (g) | 2,674 | 2,590 | 2,460 |
| Sn(Oct)$_2$ (g) | 8.39 | 10.17 | 11.59 |
| Spinning concentration (wt %) | 20 | 25 | 30 |
| Polymerization temperature (° C.) | 130 | 130 | 130 |
| Polymerization pressure (bar) | 240 | 320 | 340 |
| Molecular weight of polymer (Mv) | 164,000 | 138,000 | 144,000 |

EXAMPLES 7 TO 9

Each filament material, which was flash spun according to Examples 4 to 6, was passed through a vibrating oscillator and collected on a conveyer in the form of a web. The collected webs were calendered through a calendering roll to thereby form a point-bonded sheet type of a polymer material. Physical properties of each point-bonded sheet material prepared above were measured, wherein the results are shown in Table 2.

TABLE 2

|  | Example | | |
| --- | --- | --- | --- |
|  | 7 | 8 | 9 |
| Spinning orifice (mm) | 0.5 | 0.5 | 0.5 |
| Molecular weight of polymer (Mv) | 164,000 | 138,000 | 144,000 |
| Bonding pressure (bar) | 20 | 20 | 20 |
| Bonding temperature (° C.) | 25 | 25 | 25 |
| Base weight (g) | 3.0 | 3.0 | 3.0 |
| Deflection strength (N $m^2/g \cdot cm$) | 0.84 | 0.70 | 0.74 |
| Deflection elongation rate (%) | 14.5 | 21.1 | 20.8 |

As shown by the above, the method of preparing a biodegradable polyester polymer according to the embodiments of the present invention can prepare biodegradable polyester polymers within a short time through a solution-state polymerization process using a compressed gas as a reaction solvent. It can then prepare polymer materials both in a filament type and a sheet type through flash-spinning and callendering processes of the biodegradable polyester polymers, wherein the entire process is performed in a single consecutive process. Thus, the method according to the embodiments of the present invention can be effectively used in the manufacture of a biodegradable polyester polymer, which has high commercial utility value in the fields of medicine, chemistry, agriculture, environment and the like.

Any reference in this specification to "one embodiment," "an embodiment," "example embodiment," etc., means that a particular feature, structure or characteristic described in connection with the embodiment is included in at least one embodiment of the invention. The appearances of such phrases in various places in the specification are not necessarily all referring to the same embodiment. Further, when a particular feature, structure or characteristic is described in connection with any embodiment, it is submitted that it is within the purview of one skilled in the art to effect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, drawings and appended claims. In addition to variations and modifications in the component parts and/or arrangements, alternative uses will also be apparent to those skilled in the art.

What is claimed is:

1. A method of preparing biodegradable polyester polymer materials both in a form of a filament and a sheet using a compressed gas, comprising:
   1) preparing biodegradable polyester polymer through a solution-state polymerization process of a cyclic monomer using a compressed gas as a reaction solvent in a presence of a catalyst;
   2) performing a flash-spinning process of the biodegradable polyester polymer prepared in 1) to form a polymer material in a form of a filament; and
   3) performing a calendering process of the polymer material in the form of the filament prepared in 2) to form a polymer material in a form of a point-bonded sheet.

2. The method of claim 1, wherein the compressed gas is selected from the group consisting of HFC-23, HFC-32, HFC-152a, HFC-143a, HFC-134a, HFC-125, HFC-227ea, HFC-236fa, HFC-245fa, HFC-254cb, $SF_6$, HFC-4-10-mee, C-318 (perfluoro cyclobutane), HCFC-22, HCFC-1416, HCFC-1426, HCFC-22Sca/cb, dimethylether, nitrous oxide, propane, butane, a mixture thereof and a carbon dioxide mixture thereof.

3. The method of claim 2, wherein if the compressed gas is a carbon dioxide mixture, the carbon dioxide is present in the mixture at 20 weight % or less.

4. The method of claim 1, wherein the compressed gas is added in a liquid state while being pressurized after completely liquefying through a cooling procedure.

5. The method of claim 1, wherein the cyclic monomer is one or more monomers selected from the group consisting of lactides, lactones, cyclic carbonates, cyclic anhydrides and thiolactones.

6. The method of claim 5, wherein the cyclic monomer is one or more compounds selected from the compound represented by the following Formula 1 and the compound represented by the following Formula 2:

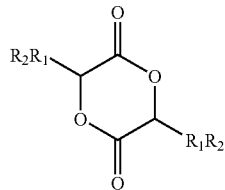

<Formula 1> wherein $R_1$ and $R_2$ are independently hydrogen or $C_1$-$C_4$ alkyl,

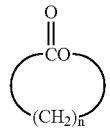

<Formula 2> wherein n is an integer in the range of 2 to 5.

7. The method of claim 6, wherein the compound of Formula 1 is L-lactide, D-lactide, D,L-lactide or glycolide.

8. The method of claim 6, wherein the compound of Formula 2 is ε-caprolactone.

9. The method of claim 1, wherein a mixed ratio of the cyclic monomer to the compressed gas is in the range of 1 to 50 weight %.

10. The method of claim 1, wherein the catalyst is selected from the group consisting of stannous octoate, stannous chloride, stannous oxide, stannous octylester, stannous chloride dihydrate, tetraphenyl tin, diethyl zinc, zinc octoate, zinc chloride, zinc oxide, aluminum chloride and aluminum ethoxide.

11. The method of claim 1, wherein a mole concentration of the catalyst to the cyclic monomer is in the range of $1.0 \times 10^{-4}$ mol/l to $5.0 \times 10^{-1}$ mol/l.

12. The method of claim 1, wherein in the solution-state polymerization of step 1), an initiator is further added.

13. The method of claim 12, wherein the initiator is 1,6-hexanediol or 1-dodecanol.

14. The method of claim 12, wherein a mole concentration of the initiator to the cyclic monomer is in the range of $1.0 \times 10^{-5}$ mol/l to $1.0 \times 10^{-3}$ mol/l.

15. The method of claim 1, wherein the solution-state polymerization process of step 1) is conducted under a reaction pressure of 40 to 70 bar.

16. The method of claim 1, wherein the solution-state polymerization process of step 1) is conducted for 0.2 to 50 hours so that a conversion rate reaches 70% or more.

17. The method of claim 1, wherein the flash-spinning process of step 2) is conducted under the same temperature and pressure as employed in the solution-state polymerization process of step 1).

* * * * *